United States Patent
Poole

[19]

[11] Patent Number: 6,119,760
[45] Date of Patent: Sep. 19, 2000

[54] ADJUSTABLE DRAPE FOR PASSENGER VEHICLE

[76] Inventor: David Poole, 3002 Oak St., Lakewood, Colo. 80215

[21] Appl. No.: 09/413,701

[22] Filed: Oct. 6, 1999

[51] Int. Cl.[7] .................................................. A47H 1/00
[52] U.S. Cl. ................ 160/330; 160/368.1; 160/370.21; 160/354; 296/24.1
[58] Field of Search ................................ 160/330, 368.1, 160/370.21, 354, 351, 388, 389, 400; 296/24.1, 138, 37.16

[56] References Cited

U.S. PATENT DOCUMENTS

| | | | |
|---|---|---|---|
| 416,540 | 12/1889 | Argerbright | 160/354 |
| 448,106 | 3/1891 | Argerbright | 160/354 |
| 2,298,783 | 10/1942 | Burnett | 160/354 |
| 4,685,484 | 8/1987 | Moneta | 160/351 |
| 4,770,086 | 9/1988 | Gabster | 160/351 |
| 4,773,802 | 9/1988 | Rewis | 160/368.1 |
| 4,842,035 | 6/1989 | Thompson | 160/351 |
| 5,121,958 | 6/1992 | Goeden et al. | 296/24.1 |
| 5,597,028 | 1/1997 | Rolf et al. | 160/368.1 |
| 5,735,564 | 4/1998 | Coogan | 296/24.1 |
| 5,954,380 | 9/1999 | Ament et al. | 296/24.1 |

FOREIGN PATENT DOCUMENTS

| | | | |
|---|---|---|---|
| 2474976 | 8/1981 | France | 296/24.1 |
| 42343 | 2/1991 | Japan | 296/24.1 |

*Primary Examiner*—Blair M. Johnson
*Attorney, Agent, or Firm*—Edwin H. Crabtree; Donald W. Margolis; Ramon L. Pizarro

[57] ABSTRACT

A vehicle drape for retaining heated air and cooled air inside a front seat area of a vehicle. The drape is adapted for releasable attachment to a pair of vehicle ceiling hanger hooks disposed on opposite sides of a ceiling of the vehicle and behind the front seats of the vehicle. Also, the drape is adaptable for adjusting to different sizes and shapes of vehicle interiors and designed for redirecting air flow back into a front seat area. The drape includes a transparent thin sheet of plastic vinyl. The sides of the thin sheet include gripping scalloped edges for gripping the sides, ceiling and floor of the vehicle. A horizontal nylon suspension strap is attached to a length of an upper portion of the thin sheet. The horizontal suspension strap includes an adjustable first end and an adjustable second end. The first end and the second end include a moveable hook fastener strap arm and a loop fastener strap arm. The moveable hook fastener strap arm is releasably attached along a length of the loop fastener strap arm. Attached to an end of the hook fastener strap arm is a stretchable "D" ring. The "D" rings mounted on the first end and the second end of the suspension strap are adapted for releasably engaging the vehicle ceiling hanger hooks inside the vehicle. The adjustable first and second ends of the suspension strap allow the vehicle drape to be quickly adjusted to different widths of vehicle interiors.

17 Claims, 1 Drawing Sheet

ADJUSTABLE DRAPE FOR PASSENGER VEHICLE

BACKGROUND OF THE INVENTION (a) Field of the Invention

This invention relates to devices for controlling temperatures inside a vehicle and more particularly, but not by way of limitation, to a vehicle drape used for retaining heated air and cooled air inside a front seat area of the vehicle.

(b) Discussion of Prior Art

Heretofore there have been a number of different types of partitions, screens and shades used for mounting inside a vehicle to help control the temperature therein. In U.S. Pat. No. 5,238,282 to Watson et al., U.S. Pat. No. 5,207,722 to Lee and U.S. Pat. No. 5,630,460 to Yuan three different types of interior partitions for controlling temperature in a front half of a passenger vehicle are described. In U.S. Pat. No. 4,621,856 to McKenzie, U.S. Pat. No. 4,938,518 to Willemsen, U.S. Pat. No. 4,818,007 to Mahoney, U.S. Pat. No. 4,818,007 to Hunter and U.S. Pat. No. 4,738,480 to Ward various types of vehicle partitions, screens and shades are shown for mounting inside an automobiles and vans.

None of the above mentioned patents disclose the unique features, combination of structure and function of the subject vehicle drape with its objects and advantages as described below.

SUMMARY OF THE INVENTION

In view of the foregoing, it is a primary object of the subject invention to provide a vehicle drape that efficiently retains heated air and cooled air inside a front seat area of a vehicle. When using the vehicle drape in the winter, a heater in the vehicle can more quickly heat the front seat area of the vehicle and keep the warm air circulated in the front seat area during outside cold conditions. In turn, the vehicle drape in the summer will help the air conditioning system of the vehicle more quickly cool the front seat area and maintain circulated cool air in the front seat area during outside hot conditions.

Another object of the new vehicle drape is the invention is adapted for releasable attachment to a pair of vehicle ceiling hanger hooks disposed on opposite sides of a ceiling of the vehicle and behind the front seats of the vehicle. The vehicle drape is easy to install and can be quickly removed when its use is no longer required.

Yet another object of the invention is the drape is adaptable for adjusting to different sizes and shapes of vehicle interiors. All of the sides of the drape can be contoured next to the sides, ceiling and floor of the vehicle. The drape is designed for redirecting hot and cold air back into the front seat area.

Still another object of the invention is the drapes simplicity in design and durability. A majority of the drape is transparent for allowing unrestricted clear vision when viewing the back of the vehicle using a rear view mirror.

The vehicle drape includes a transparent thin sheet of plastic vinyl. The sides of the thin sheet include scalloped edges for gripping the sides, ceiling and floor of the vehicle to reduce air flow from escaping into a rear of the vehicle. A horizontal nylon suspension strap is attached to a length of an upper portion of the thin sheet. The horizontal suspension strap includes an adjustable first end and an adjustable second end. The first end and the second end include a moveable hook fastener strap arm and a loop fastener strap arm. The moveable hook fastener strap arm is releasably attached at various locations along a length of the loop fastener strap arm. Attached to an end of the hook fastener strap arm is a stretchable "D" ring. The "D" rings mounted on the first end and the second end of the suspension strap are adapted for releasably engaging the vehicle ceiling hanger hooks inside the vehicle. The adjustable first and second ends of the suspension strap allow the vehicle drape to be quickly adjusted to different widths of vehicle interiors. The stretchable "D" rings also provide for holding the suspension strap taut when suspending the thin sheet therefrom. Also, flexible sides of the thin sheet allow the drape to be contoured to different shapes of vehicle interiors. The drape provides for improved efficiency in heating and cooling the front seat area of the vehicle.

These and other objects of the present invention will become apparent to those familiar with different types of vehicle screens, partitions and shades used in various types of vehicles when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
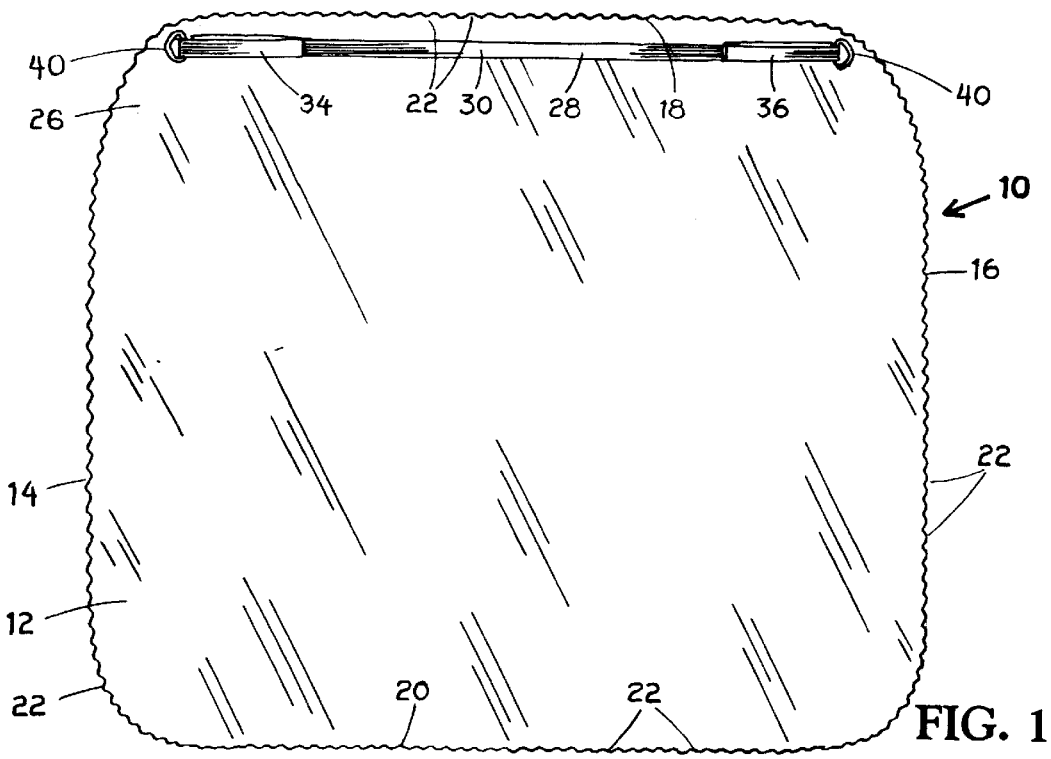
FIG. 1 is a front view of the subject vehicle drape illustrating the transparent thin sheet with scalloped edges. An upper portion of the this sheet is shown attached to a horizontal nylon suspension strap. The strap includes an adjustable first end and an adjustable second end.
Figure 3:
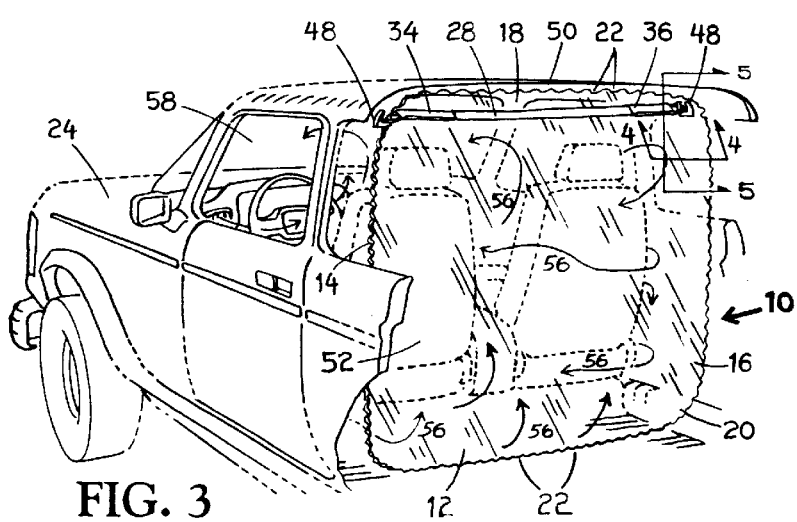
FIG. 3 is a perspective view of a front portion of a vehicle with the rear of the vehicle cut away to illustrate the vehicle drape attached to a pair of vehicle ceiling hanger hooks. The ceiling hanger hooks are positioned on opposite sides of the ceiling of the vehicle and behind front seats of the vehicle. The vehicle drape is shown suspended directly behind the front seats.

In FIG. 1, a front view of the subject vehicle drape illustrating and having general reference numeral 10. The vehicle drape 10 includes a transparent thin sheet 12 made of clear plastic vinyl or like material and with a thickness of approximately 16 gauge. The sides 14 and 16, top 18 and bottom 20 of the sheet 12 are pinked with scalloped edges 22. The scalloped edges 22 provide for gripping the sides, ceiling and floor of a vehicle 24 to help prevent circulated heated and cooled air from escaping from the front of the vehicle into the rear seat area of the vehicle. The vehicle 24 is shown in FIG. 3. Also, the sides 14 and 16, the top 18 and the bottom 20 are contoured to correspond with the contoured shape of the sides, ceiling and floor of the vehicle 24.

An upper portion 26 of the thin transparent sheet 12 is shown attached to a horizontal nylon suspension strap 28. The suspension strap 28 is divided into a front portion 30 and a rear portion 32 with the upper portion 26 of the sheet 12 sandwiched and secured therebetween. The rear portion 32 of the suspension strap 28 can be seen in FIGS. 2A, 2B and 5. The suspension strap 28 also includes an adjustable first end 34 and an adjustable second end 36.

Figure 2A:
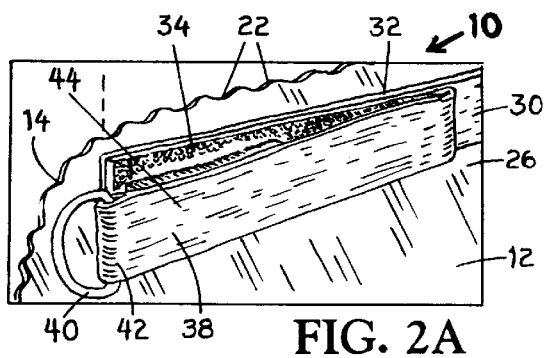
FIG. 2A is an enlarged perspective view of a portion of the horizontal suspension strap and the adjustable first end with moveable hook fastener strap arm with "D" ring and loop fastener strap arm.

In FIG. 2A, an enlarged perspective view of a portion of the horizontal suspension strap 28 and the adjustable first end 34 are shown in detail. The first end 34 includes a moveable hook fastener strap arm 38 with a "D" ring 40 mounted on an end 42 of the strap arm 38. The first end 34 of the suspension strap 28 also includes a loop fastener strap arm 44 disposed next to the hook fastener strap arm 38. In this drawing, the hook fastener strap arm 38 is shown fully extended and releasably engaged with the loop fastener strap arm 44. The second end 36 of the suspension strap 28 also includes a moveable hook fastener strap arm 38 with "D" ring 40 and a loop fastener strap arm 44.

Figure 2B:
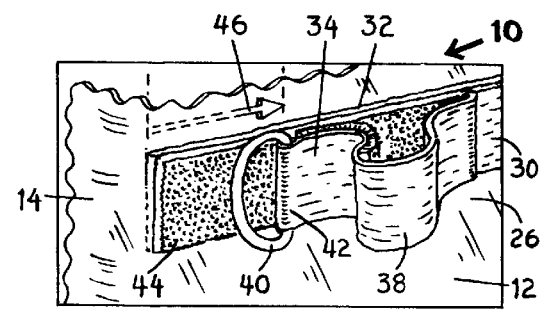
FIG. 2B is similar to the enlarged perspective view of the suspension strap shown in FIG. 2A with the width of the suspension strap shortened by adjusting the hook fastener strap arm inwardly on the loop fastener strap arm.

In FIG. 2B, another enlarged perspective view of the suspension strap 28 is shown and similar to FIG. 2B. In this drawing, the overall attachment width of the drape 10 is shortened, for example 1 to 2 inches or more, by adjusting the width of the suspension strap 28. This is done by moving the hook fastener strap arm 38 inwardly, as shown by arrow 46, and again releasably securing the hook fastener strap arm 38 on the loop fastener strap arm 44 as shown. In this manner, the vehicle drape 10 can be expanded or retracted for different interior widths of various types and models of vehicles. Also, it should be mentioned that the stretchable "D" rings 40 provide for holding the suspension strap 28 taut when suspending the thin sheet 12 therefrom.

In FIG. 3, a perspective view of a front portion of the vehicle 24 is shown with the rear of the vehicle cut away to illustrate the subject invention. In this view, the vehicle drape 10 is shown with the "D" rings of the first and second ends 34 and 36 of the suspension strap 28 attached to a pair of vehicle ceiling hanger hooks 48. The ceiling hanger hooks 48 are positioned on opposite sides of a ceiling 50 of the vehicle 24 and behind front seats 52 and 54. The vehicle drape 10 is shown suspended directly behind the front seats 52 and 54. Note arrows 56 which illustrate circulated heated or cooled air engaging a front side of the thin sheet 12 and being redirected back into a front seat area 58 of the vehicle 24.

While the vehicle drape 10 in FIG. 3 is shown suspended behind the front seats 52 and 54, it can be appreciated that the drape 10 can also be suspended behind additional rows of seats in an extended length vehicle where passengers are seated.

Figure 4:
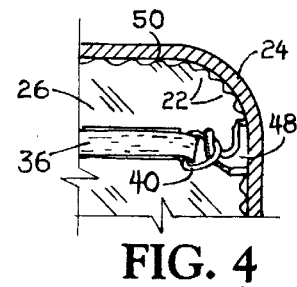
FIG. 4 is an enlarged sectional view of a portion of the drape and taken along lines 4—4 shown in FIG. 3. This view shows a portion of the adjustable second end of the suspension strap with a "D" ring engaging a vehicle ceiling hanger hook in the ceiling of the vehicle.

In FIG. 4, an enlarged sectional view of part of the drape 10 is shown taken along lines 4—4 in FIG. 3. In this view, a portion of the adjustable second end 36 is illustrated with the "D" ring 40 engaging the vehicle ceiling hanger hook 48 in the ceiling 50 of the vehicle 24. Note in this drawing, the scalloped edges 22 engaging the sides of the ceiling 50 of the vehicle 24 to prevent circulated air from escaping into the rear of the vehicle.

The stretchable "D" ring 40 in this drawing is shown twisted 90 degrees to engage the hanger hook 48. The twisting of the ring 40 provides a torque which assists in holding the top 18 of the sheet 12 in an upright position with scalloped edges 22 engaging the ceiling 50.

Figure 5:
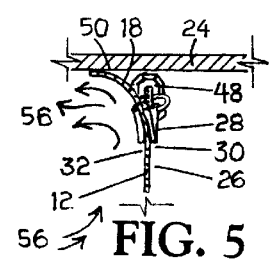
FIG. 5 is another enlarged sectional view of a portion of the drape and taken along lines 5—5 shown in FIG. 3. This view shows a top portion of the thin sheet engaging the ceiling of the vehicle. Also, the top portion of the sheet is folded toward the front seat area for redirecting air flow back into the front seat area for aiding in the heating or cooling of the vehicle.

In FIG. 5, an enlarged sectional view of part of the drape 10 is shown taken along lines 5—5 in FIG. 3. This view illustrates the top 18 of the upper portion 26 of the thin sheet 12 engaging the ceiling 50 of the vehicle 24. Also, the top 18 of the sheet 12 is folded toward the front seat area 58 for redirecting air flow 56 back into the front seat area 58 for aiding in the heating or cooling of the vehicle 24. The flexible sides 14 and 16 and the flexible bottom 20 of the thin sheet 12 can also be curved, similar to the top 18 as shown in this drawing, for redirecting the circulated air back to the front of the vehicle. Note in FIG. 2B the flexible side 14 of the sheet 12 is folded for redirecting air flow back toward the front seat area 58.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A vehicle drape for retaining heated air or cooled air inside an interior of a front seat area of a vehicle, the drape adapted for engaging contoured sides, contoured ceiling and floor of the interior of the vehicle for preventing the heated air or cooled air from escaping to the rear of the vehicle, the drape adapted for releasable attachment to a pair of vehicle ceiling hanger hooks disposed on opposite sides of the ceiling of the vehicle and behind front seats of the vehicle, the vehicle drape comprising:

a transparent thin sheet of plastic, said thin sheet having contoured sides, said contoured sides having scallops along each of said edges, said scalloped edges adapted for gripping the contoured sides of the interior of the vehicle; and suspension means attached to an upper portion of said thin sheet, said suspension means for suspending said sheet therefrom, said suspension means adapted for releaseably engaging the vehicle ceiling hanger hooks.

2. The vehicle drape as described in claim 1 wherein said contoured sides of said thin sheet are foldable, said contoured sides adapted to be folded toward the front seat area of the vehicle for redirecting air flow.

3. The vehicle drape as described in claim 1 wherein said thin sheet includes a contoured top, said contoured top adapted for gripping the contoured ceiling of the interior of the vehicle.

4. The vehicle drape as described in claim 3 wherein said contoured top of said thin sheet is foldable, said contoured top adapted to be folded toward the front seat area of the vehicle for redirecting air flow.

5. The vehicle drape as described in claim 1 wherein said suspension means is a horizontal suspension strap attached to a length of the upper portion of said thin sheet, said suspension strap having an adjustable first end and an adjustable second end, said adjustable first end and said adjustable second end adapted for releasably engaging the vehicle ceiling hanger hooks, whereby said suspension strap with adjustable first and second ends provides for adjusting the width of the suspension strap to various interior widths of vehicles.

6. The vehicle drape as described in claim 5 wherein said first end and said second end include a moveable hook fastener strap arm and a loop fastener strap arm, said moveable hook fastener strap arm releasably attached along a length of said loop fastener strap arm.

7. The vehicle drape as described in claim 6 wherein said moveable hook fastener strap arm includes a stretchable "D" ring mounted thereon adapted for releasably engaging the vehicle ceiling hanger hooks, whereby said stretchable "D" ring provides for holding said suspension strap taut to prevent a contoured convex top of said thin sheet from drooping.

8. A vehicle drape for retaining heated air or cooled air inside an interior of a front seat area of a vehicle, the drape adapted for engaging contoured sides, contoured ceiling and floor of the interior of the vehicle for preventing the heated air or cooled air from escaping to the rear of the vehicle, the drape adapted for releasable attachment to a pair of vehicle ceiling hanger hooks disposed on opposite sides of the ceiling of the vehicle and behind front seats of the vehicle, the vehicle drape comprising:

a transparent thin sheet of plastic, said thin sheet having contoured sides, said contoured sides having scallops along each of said edges, said scalloped edges adapted for gripping the contoured sides of the interior of the vehicle; and a horizontal suspension strap attached to a length of an upper portion of said thin sheet, said suspension strap having an adjustable first end and an adjustable second end, said first end and said second end adapted for releasable engagement with the vehicle ceiling hanger hooks.

9. The vehicle drape as described in claim 8 wherein said contoured sides of said thin sheet are foldable, said contoured sides adapted to be folded toward the front seat area of the vehicle for redirecting air flow.

10. The vehicle drape as described in claim 8 wherein said thin sheet includes a contoured convex top, said contoured top adapted for gripping the contoured ceiling of the interior of the vehicle.

11. The vehicle drape as described in claim 10 wherein said contoured top of said thin sheet is foldable, said contoured top adapted to be folded toward the front seat area of the vehicle for redirecting air flow.

12. The vehicle drape as described in claim 8 wherein said first end and said second end include a moveable hook fastener strap arm and a loop fastener strap arm, said moveable hook fastener strap arm releasably attached along a length of said loop fastener strap arm, said suspension strap with adjustable first and second ends provides for adjusting the width of the suspension strap to various interior widths of vehicles.

13. The vehicle drape as described in claim 12 wherein said moveable hook fastener strap arm includes a stretchable "D" ring mounted thereon and adapted for releasably engaging the vehicle ceiling hanger hooks, whereby said stretchable "D" ring provides for holding said suspension strap taut, said stretchable "D" ring is twistable providing means for holding the upper portion of said thin sheet in an upright position, said movable hook fastener strap arm holding said stretchable "D" ring at close attachment to said thin sheet in an adjusted position.

14. A vehicle drape for retaining heated air or cooled air inside an interior of a front seat area of a vehicle, the drape adapted for engaging contoured sides, contoured ceiling and floor of the interior of the vehicle for preventing the heated air or cooled air from escaping to the rear of the vehicle, the drape adapted for releasable attachment to a pair of vehicle ceiling hanger hooks disposed on opposite sides of the ceiling of the vehicle and behind front seats of the vehicle, the vehicle drape comprising:

a transparent thin sheet of plastic, said thin sheet having contoured sides, said contoured sides adapted for gripping the contoured sides of the interior of the vehicle;

a horizontal suspension strap attached to a length of an upper portion of said thin sheet;

a hook fastener strap arm disposed next to and along a length of a loop fastener strap arm, said strap arms attached to a first end and a second end of said suspension strap, said hook fastener strap arm releasably attached along the length of said loop fastener strap arm; and a stretchable "D" ring mounted on an end of said hook fastener strap arm, said hook fastener strap arm holding said stretchable "D" ring at close attachment to said loop fastener strap arm and in various adjusted positions along the length of the loop fastener strap arm, said "D" ring adapted for releasably engaging the vehicle ceiling hanger hooks;

whereby said stretchable "D" ring is twistable for providing means for holding an upper portion of said thin sheet in an upright position, said stretchable "D" ring provides for holding said suspension strap taut.

15. The vehicle drape as described in claim 14 wherein said foldable contoured sides of said thin sheet are adapted to be folded toward the front seat area of the vehicle for redirecting air flow.

16. The vehicle drape as described in claim 14 wherein said foldable contoured top of said thin sheet is adapted to be folded toward the front seat area of the vehicle for redirecting air flow.

17. The vehicle drape as described in claim 14 wherein said foldable contoured sides and foldable contoured top include scalloped edges, said scalloped edges providing a gripping surface for engaging the sides and the ceiling of the vehicle.

* * * * *